United States Patent
Wang et al.

(10) Patent No.: US 7,418,131 B2
(45) Date of Patent: Aug. 26, 2008

(54) IMAGE-CAPTURING DEVICE AND METHOD FOR REMOVING STRANGERS FROM AN IMAGE

(75) Inventors: Jhing-Fa Wang, Tainan (TW); Han-Jen Hsu, Sanchong (TW); Shang-Chia Liao, Kaohsiung (TW)

(73) Assignee: National Cheng Kung University (TW)

( * ) Notice: Subject to any disclaimer, the term of this patent is extended or adjusted under 35 U.S.C. 154(b) by 439 days.

(21) Appl. No.: 11/174,671

(22) Filed: Jul. 6, 2005

(65) Prior Publication Data
US 2006/0045372 A1 Mar. 2, 2006

(30) Foreign Application Priority Data
Aug. 27, 2004 (TW) .............................. 93125916 A (51) Int. Cl.
*G06K 9/00* (2006.01)
(52) U.S. Cl. ....................... 382/165; 382/162; 382/254; 382/256; 382/257; 382/275; 345/619; 345/620
(58) Field of Classification Search ................. 382/162, 382/164, 165, 167, 254, 256, 257, 275; 345/619, 345/620; 348/231.6, 241, 246
See application file for complete search history.

(56) References Cited
U.S. PATENT DOCUMENTS

| | | | | |
|---|---|---|---|---|
| 5,784,498 A | * | 7/1998 | Venable | ...................... 382/254 |
| 6,125,193 A | * | 9/2000 | Han | ........................... 382/275 |
| 6,587,592 B2 | * | 7/2003 | Georgiev et al. | ............ 382/254 |
| 7,012,624 B2 | * | 3/2006 | Zhu et al. | .................... 382/254 |
| 7,260,273 B2 | * | 8/2007 | Sellers et al. | ............... 382/275 |
| 2001/0000025 A1 | * | 3/2001 | Darrell et al. | ............... 382/165 |
| 2002/0085750 A1 | * | 7/2002 | Hoshuyama | ................ 382/162 |
| 2005/0226522 A1 | * | 10/2005 | Gallagher | ................... 382/254 |

OTHER PUBLICATIONS

Wang et al., "Constrained Texture Synthesis by Scalable Sub-patch algorithm", Jun. 27-30, 2004, 2004 IEEE International Conference on Multimedia and Expo, vol. 1, pp. 635-638.*
Wei, Li-Yi et al., *Fast Texture Synthesis using Tree-structured Vector Quantization*, 2000.
Efros, Alexei A et al., *Texture Synthesis by Non-parametric Sampling*, 1999.
Liang, Lin et al., *Real-Time Texture Synthesis by Patch-Based Sampling*. pp. 127-150, 2001.

(Continued)

*Primary Examiner*—Vikkram Bali
*Assistant Examiner*—Daniel Zeilberger (57) ABSTRACT

An image-capturing device and method for removing strangers from an image are described. First, a first image is input. Then, a control module determines if an unwanted object processing step is needed, and obtains a result. If the result is no, the first image is directly sent to an output module. If the result is yes, an image-identifying module begins to identify the target-image and the unwanted object in the first image, and then, an unwanted object processing module starts the step to process unwanted images. The unwanted object processing step can remove the unwanted object from an image and fill the left lacuna region. Afterwards, a second image is produced and sent to the output module.

11 Claims, 6 Drawing Sheets

OTHER PUBLICATIONS

Bornard, Raphaël et al., *Missing Data Correction in Still Images and Image Sequences*, 2002.

Criminisi, A. et al., *Region Filing and Object Removal by Exemplar-Based Image Inpainting*, 2004.

Bertalmio, Marcelo et al., *Simultaneous Structure and Texture Image Inpainting*. pp. 882-889, 2003.

Gevers, Theo, *Image Segmentation and Similarity of Color-Texture Objects*. pp. 509-516, 2002.

* cited by examiner

IMAGE-CAPTURING DEVICE AND METHOD FOR REMOVING STRANGERS FROM AN IMAGE

RELATED APPLICATIONS

The present application is based on, and claims priority from, Taiwan Application Serial Number 93125916, filed Aug. 27, 2004, the disclosure of which is hereby incorporated by reference herein in its entirety.

FIELD OF THE INVENTION

The present invention is related to an image-capturing device and method for removing strangers from an image, and more particularly, to an image-capturing device and method for comparing the captured image with an image database, removing an unwanted object from an image and filling the lacuna region left after removing the unwanted object with impercipient feeling.

BACKGROUND OF THE INVENTION

In our daily life, both camera and digital camera encounter unsolvable problems in capturing a scene. For example, when photograph is taken in a tourist spot, a stranger may stand behind the target persons and also be captured into the photograph, or when the target persons finishes posing, a stranger walks through the camera lens and is also captured in the photograph. These are the problems in taking a picture. Furthermore, in famous tourist spots, the picture may not be taken again without getting in the line again. Subsequently editing the unwanted person out of the digital photograph is time consumptive and requires skill in image processing.

In previous related researches, texture synthesis and image inpainting construct the fundamentals of filling the lost region in image. Texture synthesis can be used to fill the large hole of input texture, while image inpainting can be used to repair the scratches of image. In computer vision, texture synthesis algorithms generate large similar texture from sample texture or fill the lost region of input texture called constrained texture synthesis. Image inpainting algorithms are used to repair the scratches, cracks and to remove texts from old photograph and paintings. Generally speaking, texture synthesis is applied to single texture and image inpainting is used in general image with multiple textures.

The conventional texture synthesis algorithm aims for the synthesis of a single texture. This is usually accomplished by comparing the similarity of the adjacent pixels and synthesizing the pixels with the highest similarity into the lacuna region which is left after removing the unwanted object. From the aspect of the synthesized pixel number each time, there are pixel-based and patch-based methods. L. Y. Wei and M. Levoy proposed a pixel-based method in reference: (1) "Fast texture synthesis using tree-structured vector quantization," in *Proc. ACM Conf Computer Graphics (SIGGRAPH)*, pp. 479-488, July, 2000. Another pixel-based algorithm in reference: (2) "Texture synthesis by nonparametric sampling," in *Proc. IEEE Int. Conf. Computer Vision*, vol. 2, pp. 1033-1038, September, 1999 proposed by A. Efros and T. K. Leung is slow and fails in structural texture. L. Liang et al. proposed a fast patch-based method in reference: (3) "Real-time texture synthesis by patch-based sampling," *ACM Trans. on Graphics*, vol. 20, pp. 127-150, 2001, but it is not suitable for the general image with many kinds of textures.

Considering the image inpainting algorithms, there are also pixel-based method, as proposed in reference: (4) "Missing data correction in still images and image sequences," *ACM Multimedia*, December, 2002 by R. Bornard et al., and block-based method, such as proposed in reference: (5) "Region filling and object removal by examplar-based image inpainting," *IEEE Trans. Image Processing*, vol. 13, September 2004 by A. Criminisi et al. The blocks for each pixel on the boundary of the lacuna region are used for comparison with the source region to obtain filled blocks with the highest similarity. The block-based method often results in block effect in the target region. The priority updating step is needed in each time of filling process. In addition, the extra color space transformation is also needed in previous conventional image inpainting algorithms.

Moreover, an algorithm which integrates texture synthesis and image inpainting is proposed, as in reference: (6) "Simultaneous structure and texture image inpainting," *IEEE Trans. Image Processing*, vol. 12, no. 8, August, 2003 by M. Bertalmio et al., and inwardly extends the boundary of lacuna region by Partial Differential Equation (PDEs). However, the disadvantage of this method is the blurring in the target region.

SUMMARY OF THE INVENTION

Hence, an objective of the present invention is to provide an image-capturing device and method for removing strangers from an image after comparing the image with the target-image previously stored in an image database.

Another objective of the present invention is to provide an image-capturing device and method for removing strangers from an image, which effectively fills the lacuna region left after removing the unwanted object and makes the filling region similar to the adjacent background image.

Still another objective of the present invention is to provide an image-capturing device and method for removing strangers from an image, in which the color distribution analysis is used to judge the texture characteristics around the lacuna region.

Still another objective of the present invention is to provide an image-capturing device and method for removing strangers from an image in which two modes, a sub-patch texture synthesis algorithm and a weighted interpolation method, can be determined by color distribution analysis to decrease the computing time and increase the accuracy of synthesized image.

According to the aforementioned objectives, the present invention provides an image-capturing device and method for removing strangers from an image in which the unwanted object is removed and the lacuna region left after removing the unwanted object is filled in.

The image-capturing device for removing an unwanted object from an image comprises an image-input module, an image-identifying module, an unwanted object processing module, and an output module. The image-input module receives a first image. The image-identifying module identifies at least a target-image and at least an unwanted object in the first image. The unwanted object processing module performs an unwanted object processing step to remove the unwanted object from the first image and generates a second image. The output module outputs the first image skipping the unwanted object processing step or the second image after the unwanted object processing step. Furthermore, a control module, which controls the image-input module, the image-identifying module, the unwanted object processing module, and the output module, is included, and the control module determines if the unwanted object processing step should be performed on the first image. The image-capturing device of the present invention may be a digital camera or a digital camcorder.

According to the preferred embodiment of the present invention, the image-capturing device for removing an unwanted object from an image further comprises an image database, an image-compression module, and a display unit. The image database previously stores the target-image. The image-compression module compresses the first image skipping the unwanted object processing step or the second image after the unwanted object processing step. The display unit displays the output image of the output module. The unwanted object processing module further comprises filling in at least a lacuna region resulting from removing the unwanted object.

Furthermore, the image-capturing method of the present invention is to remove the unwanted object and fill in a lacuna region left after removing the unwanted object in the aforementioned image-capturing device. The method comprises the following steps. First, a first image is input. Then, whether an unwanted object processing step should be performed on the first image is determined, and a result is obtained. If the result is no, the first image is directly sent to an output module. If the result is yes, an identifying step is started to identify at least a target-image and at least an unwanted object in the first image, and an unwanted object processing step is performed to generate a second image. Afterwards, the second image is sent to the output module. Then, the output module outputs the first image or the second image.

Moreover, the identifying step further comprises comparing the first image with the target-image previously stored in an image database, or manually identifying the unwanted object in the first image. The unwanted object processing step further comprises the following steps. First, the unwanted object is removed and at least a lacuna region in the first image is left. Another part of the first image except the lacuna region is a background area, and the background area has a plurality of first pixels around the boundary of the lacuna region. Then, a color distribution analysis step is performed on the first pixels to judge the texture characteristics around the lacuna region. Afterwards, parts of the first pixels are copied and the copied first pixels are inserted into the lacuna region to form a filled-in region.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The present invention provides an image-capturing device and method for removing an unwanted object from an image. After a first image captured is input to an image-input module, a control module manually or automatically determines if an unwanted object processing step should be performed on the first image, and a result is obtained. If the result shows that the unwanted object processing step is not needed, the first image is directly sent to an output module. Otherwise, an identifying step is performed on the first image, in which an unwanted object is manually chosen for removal, or the first image is compared with the target-image previously stored in an image database and a target-image and an unwanted object are identified in the first image by an image-identifying module. An unwanted object processing step is then performed. An unwanted object processing module removes the unwanted object from the first image and fills a lacuna region resulting from removing the unwanted object to generate a second image. Afterwards, the second image is sent to the output module. Then, an output module outputs the first image or the second image.

In the unwanted object processing step, the unwanted object processing module first judges the texture characteristics around the lacuna region. A sub-patch texture synthesis algorithm and a weighted interpolation method are used to process the inhomogeneous texture region and homogeneous texture region, respectively. In the inhomogeneous texture region, the sub-patch texture synthesis algorithm compares the similarity and synthesizes a line of image each time. Since the size of the patch can be adjusted adaptively, it is especially suitable for different textures. By adjusting the searching neighboring pixel number, it can further be used in patches with different sizes. As for the homogeneous texture region, in order to reduce the computing time, the weighted interpolation method uses the background texture that is in the same row or column to fill the lacuna region and form a filled-in area. Finally, an artifact detection method is used to evaluate the output image to achieve better quality.

In order to make the illustration of the present invention more explicit and complete, the following description is stated with reference to the drawings.

Figure 1A:
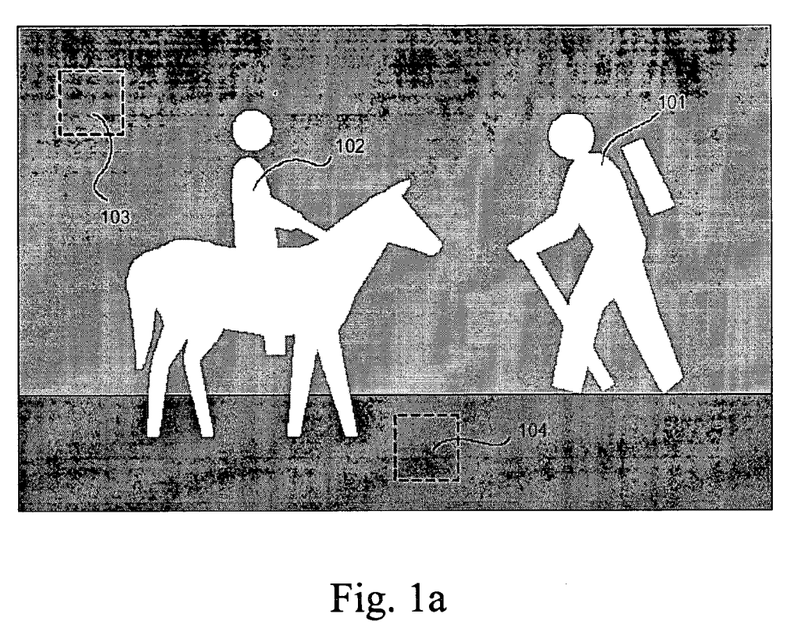
FIG. 1a is an original image.
Figure 1B:
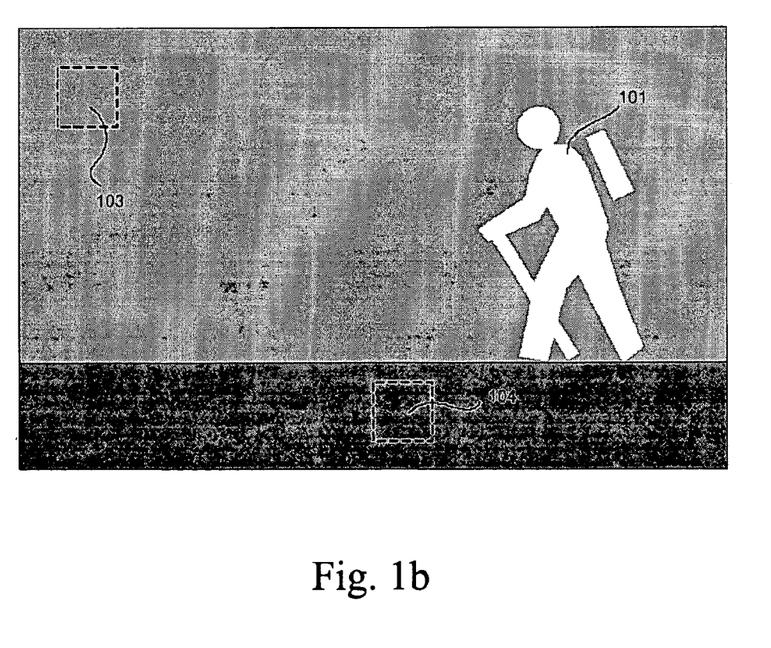
FIG. 1b illustrates the image after the operation of the present invention.

Reference is made to FIG. 1a and FIG. 1b. FIG. 1a is an original image, and FIG. 1b illustrates the image after the operation of the present invention. In FIG. 1a, when using an image-capturing device, such as a digital camera, to take pictures of target 101, sometimes an unwanted object, such as the passerby 102, is included in the image. By the image-capturing method proposed in the present invention and the first background texture 103 and/or the second background texture 104, the lacuna region left after removing the passerby 102 can be filled in and is similar to the background image as shown in FIG. 1b. In the real world, the image can be divided into two kinds as inhomogeneous texture region and homogeneous texture region. In the preferred embodiment of the present invention, a sub-patch texture synthesis algorithm is used in the inhomogeneous texture region, and a weighted interpolation method is used in the homogeneous texture region to infer the value to be filled in the lacuna region after removing the unwanted object.

Figure 2:
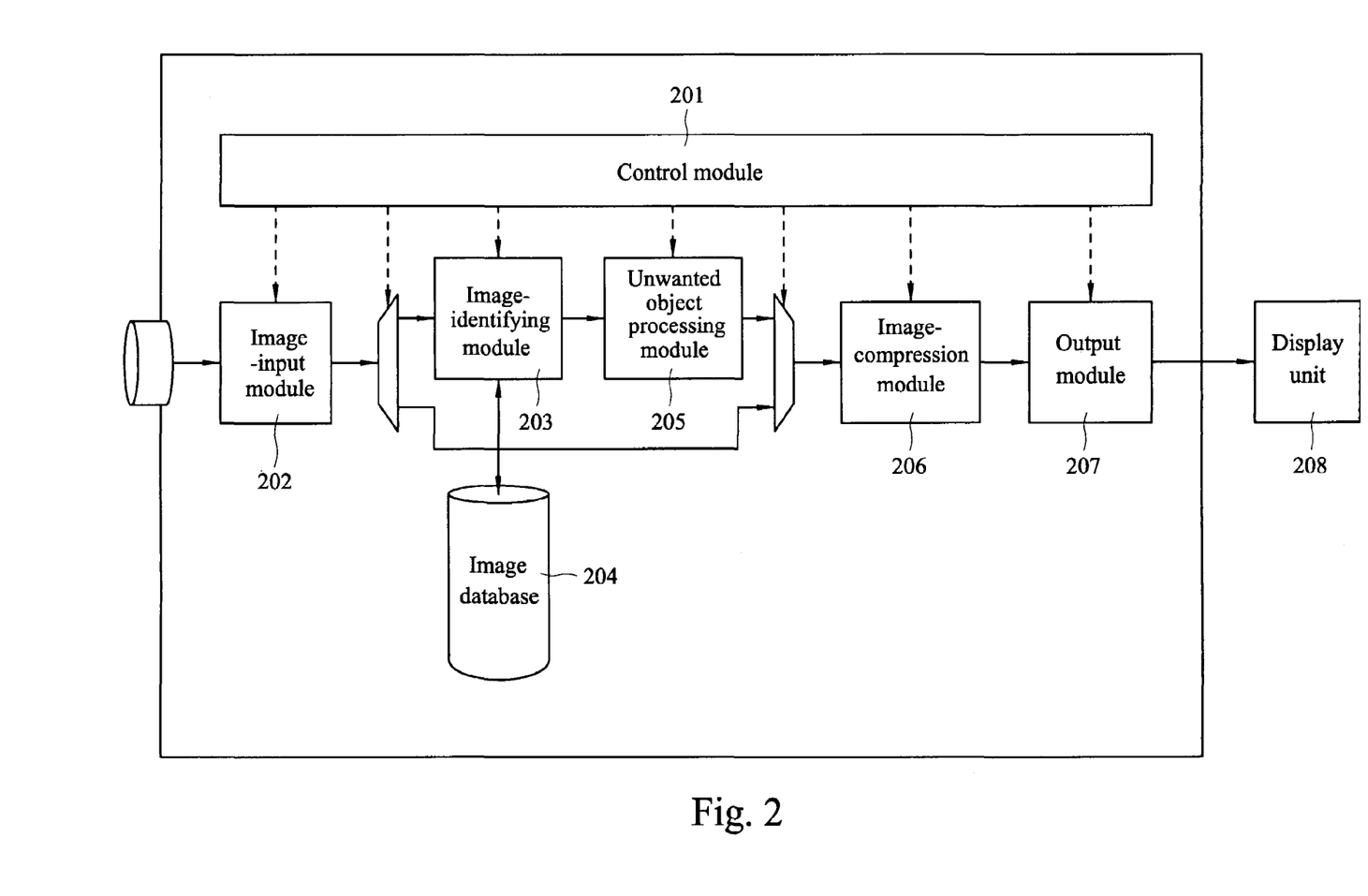
FIG. 2 illustrates the system architecture of the preferred embodiment of the present invention.

Then, reference is made to FIG. 2, illustrating the system architecture of the preferred embodiment of the present invention. In the preferred embodiment of the present invention, the image-capturing device for removing an unwanted object from an image comprises a control module 201, an image-input module 202, an image-identifying module 203, an image database 204, an unwanted object processing module 205, an image-compression module 206, an output module 207, and a display unit 208. The control module 201 controls the image-input module 202, the image-identifying module 203, the unwanted object processing module 205, the image-compression module 206, and the output module 207. After an image is input to the image-input module 202, the control module 201 manually or automatically determines if an unwanted object processing step is needed to remove the unwanted object. If the unwanted object processing step is not needed, the image captured is sent directly to the image-compression module 206. After compression, it is sent to the output module 207 and further to the display unit 208 to show the results by the image-capturing device.

When performing the unwanted object processing step, the image captured is first sent to the image-identifying module 203. After comparison with the target-image previously stored in the image database 204, the target-images in the image captured is identified. The target-images may be face image data of the whole family. The comparison method is to compute the characteristic vectors of the image captured and the target-image in the image database 204 and see if the difference of the two characteristic vectors is smaller than the threshold to judge the target-image. Further, an unwanted object can be manually selected for removed. After obtaining the comparing result or choosing the unwanted object, the unwanted object processing module 205 removes the unwanted object and fills a lacuna region resulting from removing the unwanted object. Then, the processed image is sent to the image-compression module 206 to be compressed and afterwards, sent to the output module 207 to be output. The display unit 208 shows the image with only the target-image after the unwanted object processing step.

Figure 3:
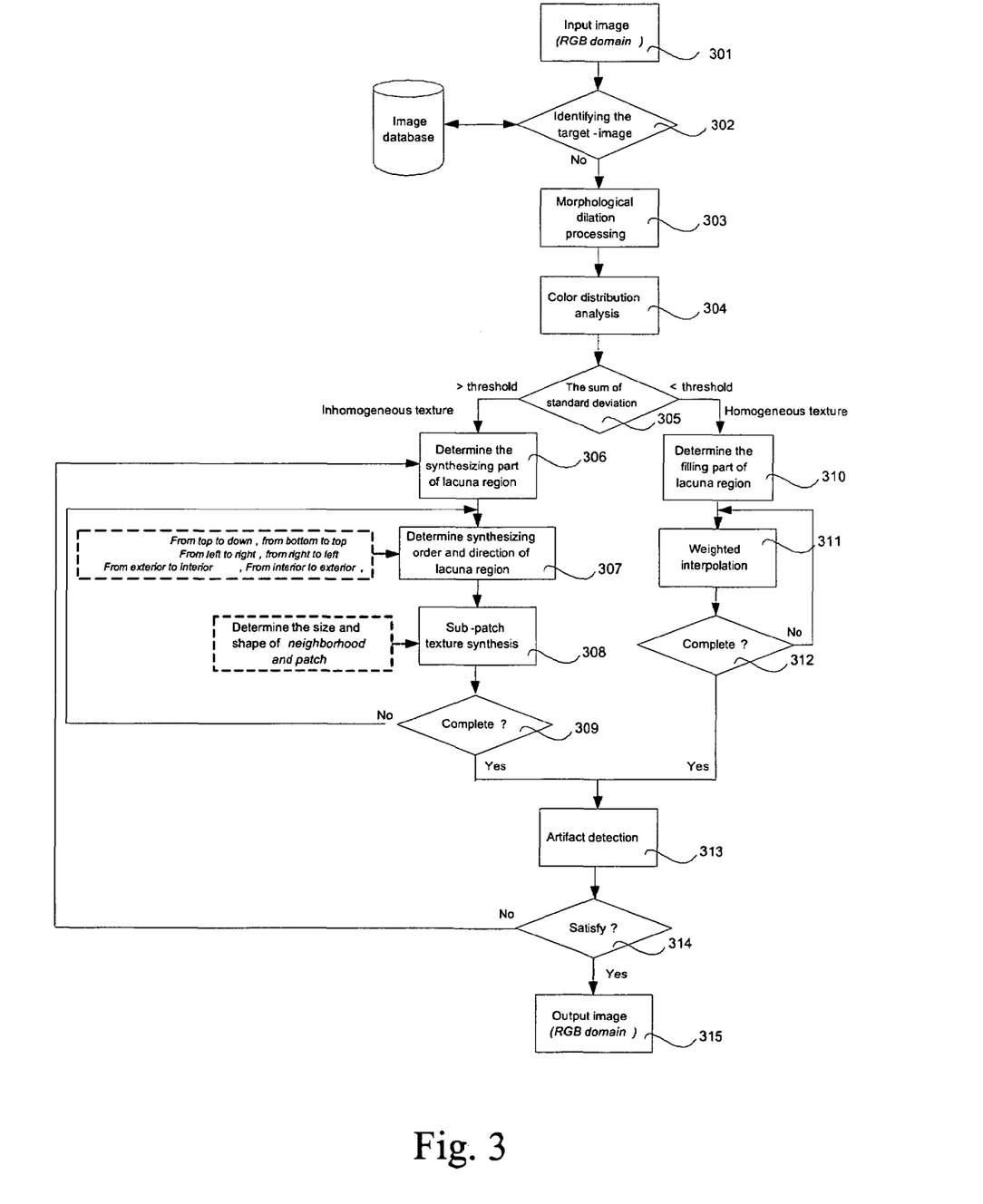
FIG. 3 is a flow diagram of the unwanted object processing step in the preferred embodiment of the present invention.

Reference is made to FIG. 3, illustrating the flow diagram of the unwanted object processing step in the preferred embodiment of the present invention. First, an image is input (step 301). In order to clearly describe the present invention, a family image and a stranger image are included in the image in the preferred embodiment of the present invention, and the family image denotes the target-image. Furthermore, the family images are previously stored in the image database.

Then, the family image is identified in step 302. By the image-identifying module, the image is compared with the family image previously stored in the image database to determine the family image and the unwanted object. The unwanted object is to be removed. After removing the unwanted object, a morphological dilation processing is used in step 303 to dilate the lacuna region that is left after the removal of the unwanted object. The morphological dilation processing makes the boundary of the edited image unobvious.

Figure 5:
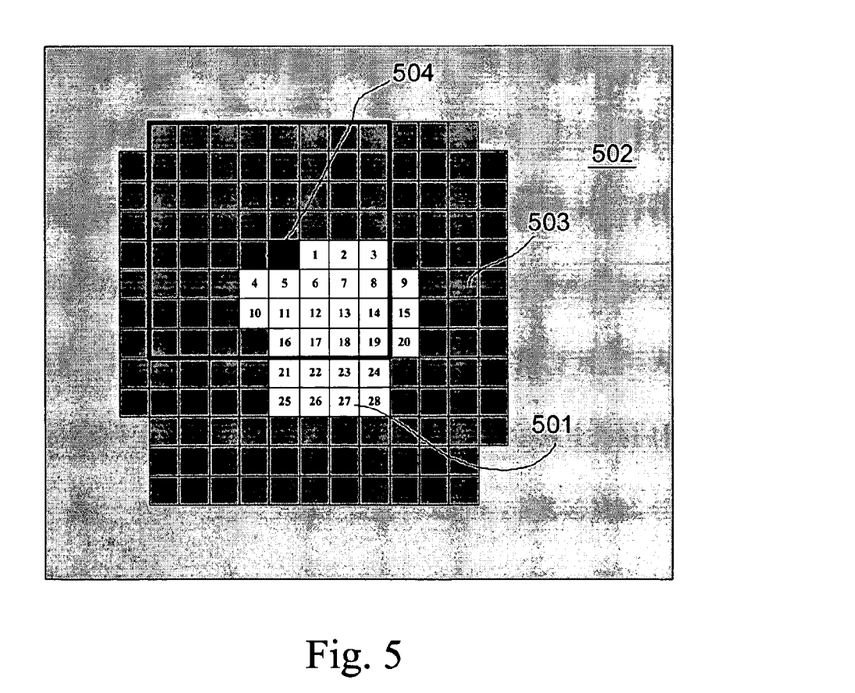
FIG. 5 is a diagram of the color distribution analysis in the preferred embodiment of the present invention.

Then, in step 304, a color distribution analysis step is performed on the pixels around the lacuna region shown in FIG. 5. Since both inhomogeneous texture region and homogeneous texture region are included in the input image captured, to make the image after editing similar to the background image, the color distribution analysis step is used in the present invention to adjust texture characteristics around the lacuna region. The measure formula is based on the sum of standard deviation in RGB channels shown as follows.

$$\alpha_u = \sqrt{\frac{\sum_{p_i}(R_{p_i} - \overline{R})^2}{K_u}} + \sqrt{\frac{\sum_{p_i}(G_{p_i} - \overline{G})^2}{K_u}} + \sqrt{\frac{\sum_{p_i}(B_{p_i} - \overline{B})^2}{K_u}} \quad (1)$$

where $\alpha_u$ is the sum of standard deviation in u-th block, $K_u$ is the number of sample pixels belonged to the source region of each block, $Rp_i$ is the pixel value at pixel $p_i$ in R channel, $Gp_i$ is the pixel value at pixel $p_i$ in G channel, and $Bp_i$ is the pixel value at pixel $p_i$ in B channel of each block, respectively. $\overline{R}$ is the mean value of $K_u$ sample pixels in R channel, $\overline{G}$ is the mean value of $K_u$ sample pixels in G channel, and $\overline{B}$ is the mean value of $K_u$ sample pixels in B channel of each block, respectively.

The sum of standard deviation in RGB channels is computed (step 305) to divide the sample pixels for color distribution analysis into the inhomogeneous texture region and the homogeneous texture region. A sum of standard deviation of the colors that exceeds the threshold means the area is the inhomogeneous texture region. A sum of standard deviation of the colors smaller than the threshold means the area is the homogeneous texture region. The threshold is decided by the empirical value 65. After the step of color distribution analysis, the sub-patch texture synthesis algorithm and the weighted interpolation method are used in the inhomogeneous texture region and the homogeneous texture region, respectively, in the present invention, and the weighted interpolation method is used to save the computing time in sub-patch texture synthesis algorithm. The mapping pixels in the lacuna region are synthesized by the sub-patch texture synthesis algorithm or filled by the weighted interpolation method.

In step 306, the synthesizing part of the lacuna region is decided. Then, the order and the direction of synthesizing is determined in step 307, in which the order is from top to bottom, from bottom to top, from left to right, from right to left, from exterior to interior, and from interior to exterior. Afterwards, the sub-patch texture synthesis algorithm is used to decide the shape and the size of the area being compared in step 308 to synthesize each texture area in the lacuna region. Then, the process is confirmed complete in step 309. If it is not finished yet, the process returns to step 307 and repeats the following steps.

In the homogeneous texture region, the filling part of the lacuna region is decided in step 310. The sample pixels for the weighted interpolation method are used to calculate the lacuna region in step 311. The sample pixels are the same as the pixels shown in step 305. Afterwards, the process is confirmed complete in step 312. If it is not finished yet, the process returns to step 311 and repeats the following steps.

After filling in the lacuna region and forming a filled-in area, whether the image is satisfactory is confirmed in the artifact detection method (step 313). If it is not satisfactory (step 314), the process returns to determine the synthesizing part of the lacuna region (step 306) again and repeats the following steps. A kirsch edge operator and a color ratio gradient are used to measure the similarity between the adjacent background texture and the filled region. Finally, the result image is output in step 315.

In the flow diagram of the unwanted object processing step in the preferred embodiment of the present invention, the morphological dilation processing used in step 303 and the artifact detection method in step 313 are optional. These steps can be skipped in other embodiments of the present invention. Besides, the sub-patch texture synthesis algorithm (step 308)

and the weighted interpolation method (step 311) proposed in the preferred embodiment of the present invention can be used independently in other embodiments.

Figure 4:
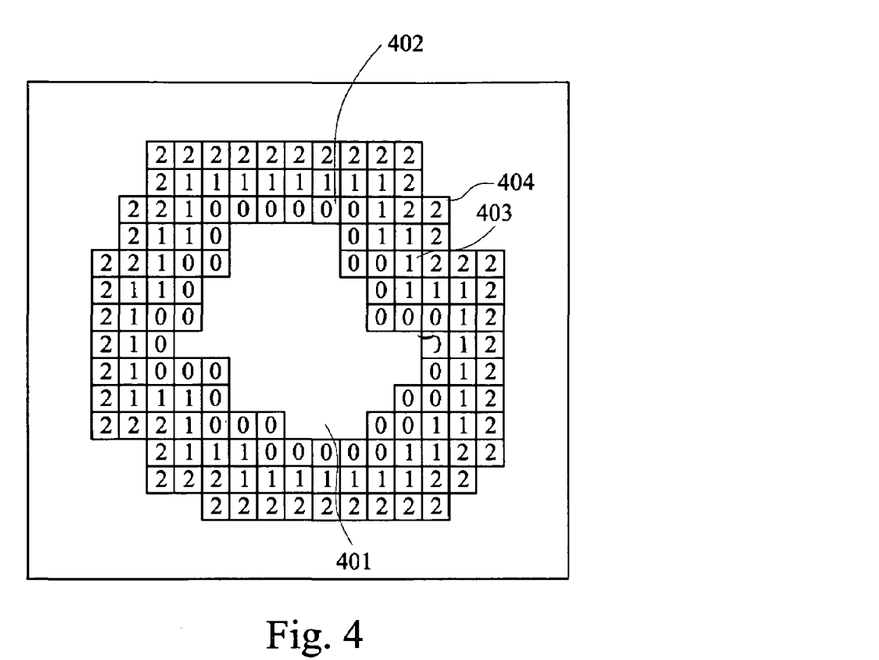
FIG. 4 is a diagram of the morphological dilation processing in the preferred embodiment of the present invention.

Reference is made to FIG. 4, illustrating the diagram of the morphological dilation processing in the preferred embodiment of the present invention. It is noted that the lacuna regions in FIG. 4 to FIG. 7 are denoted as 401 in FIG. 4 and the white parts in FIG. 5 to FIG. 7. In FIG. 4, after using the morphological dilation processing, the boundary 402 of the lacuna region 401 dilates to the boundary 404. That is, the lacuna region after dilation equals the original lacuna region 401 plus the increasing lacuna region. The lacuna region 401 is the area left after removing the unwanted object, and the boundary 402 (denoted as 0) is in the interior of the lacuna region 401. The pixels around the boundary 402 are the pixels 403 (denoted as 1) of the first round and the pixels 404 (denoted as 2) of the second round. The pixels 403 of the first round surround the boundary 402 and the pixels 404 of the second round surround the pixels 403 of the first round. The morphological dilation processing dilates the boundary of the lacuna region to reduce the artifact effect.

Then, reference is made to FIG. 5 illustrating the diagram of the color distribution analysis in the preferred embodiment of the present invention. By computing the sum of standard deviation of the pixels 503, the texture characteristics around the lacuna region 501 may be determined. The gray part of the image is the source region 502 and the dark gray pixels 503 in the source region 502 are the sample pixels for color distribution analysis. For example, in the preferred embodiment of the present invention, there are two kinds of texture around the lacuna region 501. The number of the sample pixels around the lacuna region 501 needed for computing the standard deviation can be adjusted in accordance with the pixel number of the lacuna region. The index u of the lacuna region 501 is used to explain the sample block for color distribution analysis. The corresponding line of pixels is synthesized by sub-patch texture synthesis technique when one of the mapping pixels is inhomogeneous texture region. For example, the block with index 0 (504) is inhomogeneous texture region and the blocks with index 1, 2, 3 are homogeneous texture region. The four pixels of the lacuna region are synthesized by the sub-patch texture synthesis technique. This can ensure the image quality by applying sub-patch texture synthesis technique in most cases. The color distribution analysis is used to decide the branch before the sub-patch texture synthesis algorithm and the weighted interpolation method.

The following describes the sub-patch texture synthesis algorithm and the weighted interpolation method of the present invention in detail.

Figure 6A:
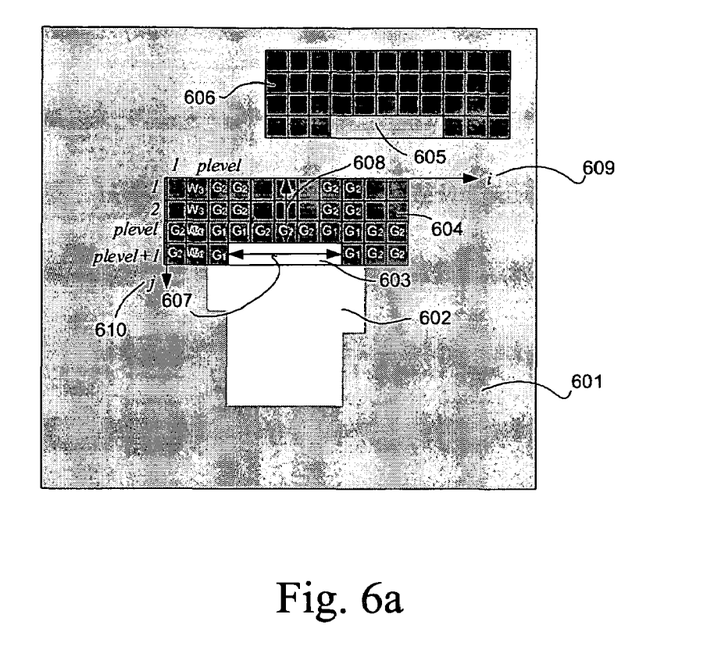
FIG. 6a is a diagram of the sub-patch texture synthesis algorithm in the preferred embodiment of the present invention.

Reference is made to FIG. 6a illustrating the diagram of the sub-patch texture synthesis algorithm in the preferred embodiment of the present invention. For example, in FIG. 6a, the image is divided into the source region 601 and the lacuna region 602. A patch in a reverse U-shape is used in the sub-patch texture synthesis algorithm in the preferred embodiment of the present invention to set up a probability model of the texture. Since the pixels of the image are most similar to the neighboring pixels in probability, the reverse U-shaped patch can raise the probability of similarity in pixels and thus makes the synthesized image without artifact effect. In the preferred embodiment of the present invention, for example, if it is to synthesize the first row of the lacuna region 602, the first row of the lacuna region 602 is considered as a current patch 603. Then, the neighboring pixels of the current patch 603 is denoted as a neighborhood of the current patch 604, which surrounds the current patch 603 in a reverse U-shape. Therefore, the pixels in the neighborhood of the current patch 604 are most similar to the pixels in the current patch 603. Then, the process searches for a second patch with the same size as the neighborhood of the current patch 604 in the source region 601. The second patch surrounds a part of the source region 601 in a reverse U-shape, and the part surrounded is assumed as a candidate patch. For example, in FIG. 6a, the second patch 606 is denoted as the neighborhood of the candidate patch, which surrounds a candidate patch 605 in a reverse U-shape. Finally, the candidate patch 605 with the highest similarity replaces the current patch 603. In this way, vertically and from top to bottom, the image in the lacuna region 602 is sequentially synthesized. Therefore, when synthesizing the current patch 603, the current patch 603 is filled with the candidate patch 605 to complete the synthesis of the current patch 603.

The equation to compute the distance is shown as follows:

$$N^*_{can} = \underset{N_{can}}{\operatorname{argmin}} \left( \sum_{R,G,B} \sum_{p_i} ww_{ij} d^2 + \sum_{Y} \sum_{p_i} ww_{mn} d + \sum_{L} \sum_{p_i} wd + \sum_{p_i} 1.5w(i \times dgx + j \times dgy) + \sum_{p_i} wG_t(plevel \times dgx + plevel \times dgy) \right) \quad (2)$$

for $i = 1$ to $(2 \times plevel + W_{patch})$, $j = 1$ to $plevel + 1$ $$\begin{cases} d = |N_{can}(p_i) - N_{cur}(p_i)| \\ dgx = |\nabla_x \cdot (\Delta_x N_{can}(p_i)) - \nabla_x \cdot (\Delta_x N_{cur}(p_i))| \\ dgy = |\nabla_y \cdot (\Delta_y N_{can}(p_i)) - \nabla_y \cdot (\Delta_y N_{cur}(p_i))| \end{cases}$$ where $$w = \begin{cases} 0, \text{ if } p_i \in \text{lacuna region} \\ 1, \text{ if } p_i \in \text{source region} \end{cases}, \quad w_{ij} = \begin{cases} 26, \text{ if } j = plevel + 1 \\ 5, \text{ if } j = plevel + 1 \\ 1, \text{ otherwise} \end{cases},$$

$$w_{mn} = \begin{cases} 2, \text{ if } j = plevel = plevel + 1 \\ 1, \text{ otherwise} \end{cases}$$

$$G_t = \begin{cases} 5, \text{ if } t = 1 \\ 2.5, \text{ if } t = 2 \\ 0, \text{ otherwise} \end{cases},$$

$W_{patch}$ denotes the patch length (607), plevel denotes the patch level (608), i denotes the position index in horizontal direction (609), j denotes the position index in vertical direction (610), where $N_{cur}(p_i)$ represents the feature value at pixel $p_i$ in the neighborhood of current patch, $N_{can}(p_i)$ represents the feature value at pixel $p_i$ in the neighborhood of candidate patch, respectively, $\nabla_x \cdot (\Delta_x N_{can}(p_i))$ represents the value of the gradient of Laplacian in horizontal at pixel $p_i$ in neighborhood of candidate patch, $\nabla_y \cdot (\Delta_y N_{cur}(p_i))$ represents the value of the gradient of Laplacian in vertical at pixel $p_i$ in neighborhood of current patch.

The features include R, G, B color channels (R, G, B), luminance (Y), Laplacain (L), and gradient of Laplacain. The weights are decided by the experiments and the tradeoff between colors and edge information. The proposed technique adopts the general RGB color space which is different from previous image inpainting algorithms. The extra color space transform from RGB to L*a*b* is avoided. In addition, the position in the matching formula is also important to be considered as a feature. This also avoids the distance between two patches with the same feature value in different position being the same. The increasing weights in position from left to right in horizontal direction and from top to bottom are designed to enhance the importance near the lacuna region.

Since the shape and the size of the neighborhood of the current patch 604 and the neighborhood of the candidate patch 606 are the same and each of them has h pixel dots, the pixel value of the pixels ($p_i$) contained in the neighborhood of the current patch 604 and the neighborhood of the candidate patch 606 need to be computed in computing the similarity. The smaller the value of distance, the higher the similarity of the current patch 603 and the candidate patch 605. Therefore, when computing the minimum distance value, the candidate patch is the second patch that is most similar to the neighborhood of the current patch 604.

Figure 6B:
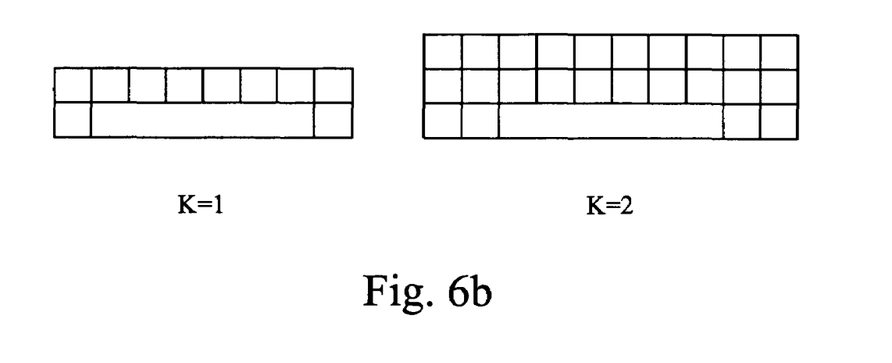
FIG. 6b is a diagram illustrating the number of the neighboring pixels needed for one and two searching rounds.

In processing a lacuna region with different sizes, the width of the patch 607 ($W_{patch}$) can be adjusted to different sizes. Since the number of the neighboring pixels of the patch in searching affects the quality of the image synthesized, according to different texture property, different number of rounds and number of neighboring pixels are needed in searching. Generally speaking, more neighboring pixels are needed in a smooth image area and fewer neighboring pixels are needed in a structural image area. For example, if there is one round in a reverse U-shape in computing, the number of the neighboring pixels needed is the width of the patch 607 plus four dots (denoted as $W_{patch}+(4*1)$). If there are two rounds in a reverse U shape in computing, the number of the neighboring pixels needed is twice the width of the patch 607 plus four dots and six dots (denoted as $2W_{patch}+(4*1)+(4*2)$). Therefore, it can be inferred that if there are K rounds in a reverse U shape in computing, the number of neighboring pixels needed is:

$$K \times W_{patch} + \sum_{i=1}^{k} 4 \times i \quad (3)$$

where K represents the rounds in searching, and $W_{patch}$ represents the width of the patch. FIG. 6b illustrates the diagram of the number of the neighboring pixels needed when K equals 1 and 2, i.e. the searching rounds are one and two.

Figure 7:
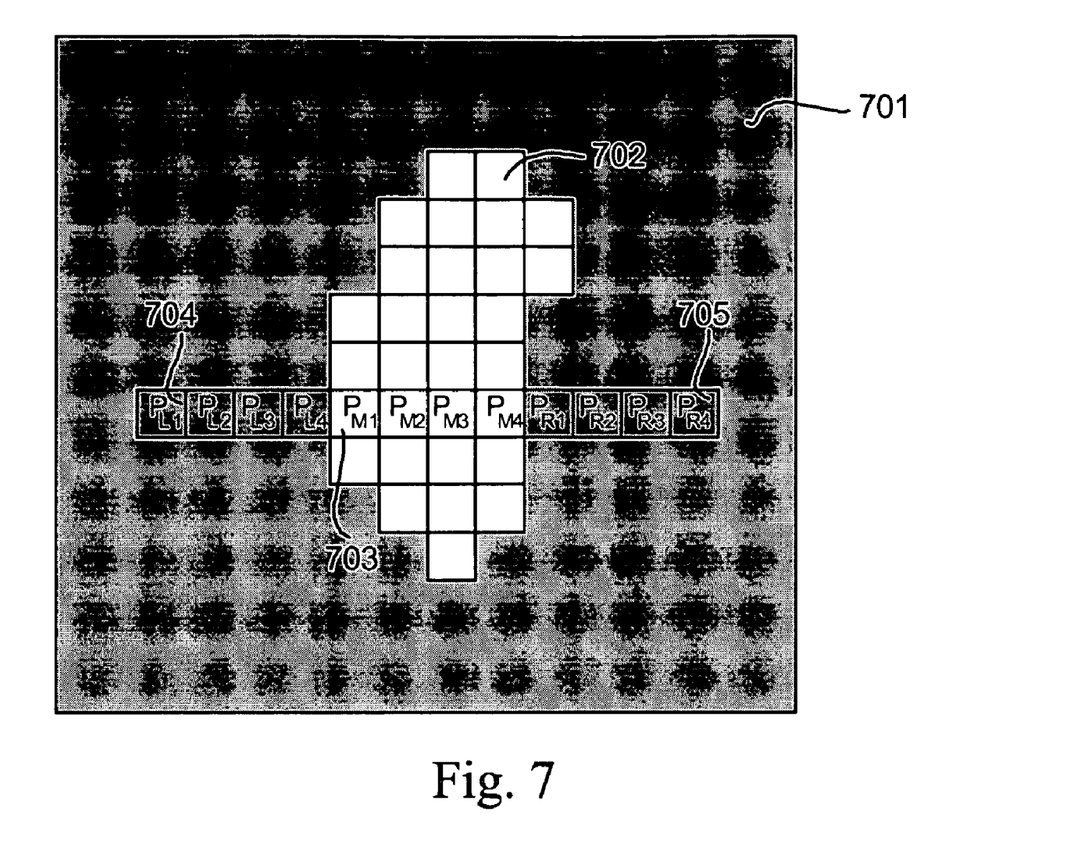
FIG. 7 is a diagram of the weighted interpolation method in the preferred embodiment of the present invention.

Reference is made to FIG. 7, which is a diagram of the weighted interpolation method in the preferred embodiment of the present invention. The pixel of source region 701 is used in the present invention to fill a lacuna region 702. For example, in filling the pixels 703 in the lacuna region 702, the pixels in the left source region 704 and the pixels in the right source region 705 in the same row with the pixel 703 are used. First, the pixel value in the left source region 704 multiplied by a weighted value and the pixel value in the right source region 705 multiplied by a weighted value are calculated, respectively. Then, the two results are averaged. The weighted value may be a Gaussian kernel. The result after averaging is the value of the pixel 703 in the lacuna region 702. For example, if the pixel value $P_{M1}$ in FIG. 7 is being calculated, then the pixel value $P_{L1}$ and the pixel value $P_{R1}$, are averaged. Since the pixel $P_{L1}$, two dots in the left side and the right side of the pixel $P_{L1}$, the pixel $P_{R1}$, and two dots in the right side of the pixel $P_{R1}$, belong to the source region 701, equation (4) can be used. However, when computing the pixel value of two dots in the left side of the pixel $P_{R1}$, since the two dots in the left side of the pixel $P_{R1}$, belong to the lacuna region 702, the pixel value in the source region 701 is needed to compute the pixel value of two dots in the left side of the pixel $P_{R1}$ In this way, each pixel value in the lacuna region 702 can be acquired. Equation (4) is as follows:

$$P_{Mi''} = \left( \sum_{n=i''-2}^{i''+2} W_n P_{Ln} + \sum_{n=i''-2}^{i''+2} W_n P_{Rn} \right) / 2 \quad (4)$$

where i'' denotes the column or the row in the image, W is a weighted value, $W_{i''-2}$ and $W_{i''+2}=0.05$, $W_{i''-1}$ and $W_{i''+1}=0.25$ and $W_{i''}=0.4$ if $P_{Ln}$ and $P_{Rn}$ are in the source region 701 and $P_{Mi''}$ is a pixel value in the lacuna region 702, and if $P_{Ln}$ or $P_{Rn}$ are in the lacuna region 702, $P_{i''+1}=2P_{i''}-P_{i''-1}$, $P_{i''+2}=2P_{i''}-P_{i''-2}$, $P_{i''-1}=2P_{i''}-P_{i''+1}$, and $P_{i''-2}=2P_{i''}-P_{i''+2}$ are further included. In other embodiments, the pixels in the source region of the same column may also be used to infer the value to be filled in the lacuna region.

After the first time of synthesizing and filling step, an artifact detection method is applied to the target region (lacuna region after filled). The artifact detection method may be the method proposed in reference: (7) "Image Segmentation and Similarity of Color-Texture Objects," *IEEE Tran. Multimedia*, vol. 4, no. 4, 2000 proposed by T. Gevers. For example, the input image is first divided into blocks with size of 16×16 pixels. Then, the Kirsch edge operator is used to detect the artifact region roughly. The candidate pixel will be selected by the Kirsch edge operator value which is above the threshold 285. The candidate block will be selected by the number of candidate pixels over 160. The Kirsch candidate block in the target region will be decided by counting the neighboring candidate blocks over five blocks. After selecting the Kirsch candidate blocks, the color ratio gradients will determine the violation blocks.

Each block in the target region is compared to surrounding blocks by histogram intersection.

$$D(H_1, H_2) = \frac{\sum_{k=1}^{N} H_1(k) H_2(k)}{\sum_{k=1}^{N} (H_1(k))^2} \quad (8)$$

where N is the bin number separated into 100 scales, $H_1(k)$ is the histogram of the Kirsch candidate block, $H_2(k)$ is the histogram of one block in the neighboring blocks.

The Kirsch candidate block is considered as violation block when the value of histogram intersection in each block of the neighboring blocks under the threshold value is less than three.

Hence, from the preferred embodiment of the present invention described above, the advantages of the present invention are as follows. First, the color distribution analysis is used in the present invention to adjust the texture characteristics in the image, and further to decide either of the two methods in synthesizing. The exhaustive matching can be reduced by the weighted interpolation method, and thus time is conserved. Next, the method disclosed in the present invention can solve the problem of the conventional pixel-based method, which is slow and fails in the structural texture. It can also solve the problem of the conventional block-based method, block effect. In the synthesizing procedure, the extra color space transformation is also avoided. The present invention not only can precisely synthesize the image in accordance with different texture types, but also can deal with an intersection area that cannot be resolved by conventional methods. The sub-patch texture synthesis algorithm proposed can solve the edge connection problem without the pre-segmentation and deciding filling priority. The present invention provides the artifact detection method to repaint the faulty regions automatically to increase the quality of final image. Furthermore, the algorithm disclosed in the present invention is quite regular, and the method of comparing is line-based, so it can cooperate with the line-memory in the digital image-capturing device, and further be integrated in the hardware of the digital image-capturing device to accelerate the computation.

Table 1 lists the comparison of the present invention and the conventional texture synthesis algorithms. It can be inferred from Table 1 that the present invention has better efficiency in synthesizing and more regularity. Table 2 lists the comparison of the present invention and the conventional image inpainting algorithms. From Table 2, it can also be inferred that the present invention has better efficiency in synthesizing and more regularity. The advantages of the present invention can be perceived thereby. Since the comparing range is usually the whole image in the texture synthesis algorithms and the image inpainting algorithms, the computing time is huge. The color distribution analysis is used in the present invention to adjust the texture characteristics in the image and further to decide the methods in synthesizing. Thus, the computing may be simplified.

inputting a first image;

determining if an unwanted object processing step should be performed on the first image, and obtaining a result;

if the result is no, directly sending the first image to an output module;

if the result is yes, starting an identifying step to identify at least a target-image and at least an unwanted object in the first image, and performing an unwanted object processing step to generate a second image, wherein the unwanted object processing step comprises:

removing the unwanted object and leaving at least a lacuna region in the first image, wherein another part of the first image other than the lacuna region is a background area, and the background area has a plurality of first pixels around an boundary of the lacuna region;

performing a color distribution analysis step on the first pixels to adjust the texture characteristics around the lacuna region; and performing a copy step to copy part of the first pixels and insert copied first pixels into the lacuna region to form a filled-in area, wherein the step of copying part of the first pixels

TABLE 1

| method | The synthesized unit | The number of pixels compared | The number of pixel synthesized | Efficiency in synthesizing | Regularity |
|---|---|---|---|---|---|
| Wei | Pixel | $\frac{1}{2}(W_B^2 - 1)$ | 1 | Low | Medium |
| Efros | Pixel | $W_B^2$ | 1 | Low | High |
| Liang | Patch | $4 \times \left(\frac{1}{6}W_B^2\right) + 4 \times \left(\frac{1}{6}W_B\right)^2$ | $W_B^2$ | High | Low |
| The present invention | Sub-patch | $K \times W_{patch} + \sum_{i=1}^{k} 4 \times i$ | $W_{patch}$ | High | High |

TABLE 2

| Author | The unit synthesized | The number of pixel dots compared | The number of pixel synthesized | Efficiency in synthesizing | Regularity |
|---|---|---|---|---|---|
| Bornard | Pixel | $W_B^2 - n$ | 1 | Low | Low |
| Bertalmio | Pixel | $W_B^2$ | 1 | Low | High |
| Criminisi | Block | $W_B^2 - n$ | n | Medium | Low |
| The present invention | Sub-patch | $K \times W_{patch} + \sum_{i=1}^{k} 4 \times i$ | $W_{patch}$ | High | High |

As is understood by a person skilled in the art, the foregoing preferred embodiments of the present invention are illustrative of the present invention rather than limiting of the present invention. It is intended that various modifications and similar arrangements be covered within the spirit and scope of the appended claims, the scope of which should be accorded the broadest interpretation so as to encompass all such modifications and similar structures.

What is claimed is:

1. An image-capturing method, suitable in an image-capturing device for removing an unwanted object from an image, the image-capturing method comprising:

and inserting the copied first pixels into the lacuna region is in accordance with an algorithm, and the algorithm comprising:

according to the number of the texture types around the lacuna region, setting the background are to at least a first texture region;

in the first texture region, setting the boundary of the lacuna region to at least a first patch surrounding part of the lacuna region in a reverse U-shape and having a plurality of second pixels;

finding a second patch having same size as the first patch in the first texture region and surrounding part of the background are in a reverse U-shape has a plurality of third pixels, wherein the step of finding the second patch is in accordance with computing a distance of the second pixels and the third pixels and the step of computing the distance is in accordance with an equation as follows:

$$N_{can}^* = \underset{N_{can}}{\operatorname{argmin}} \left( \sum_{R,G,B} \sum_{p_i} ww_{ij}d^2 + \sum_{Y} \sum_{p_i} ww_{mn}d + \sum_{L} \sum_{p_i} wd + \sum_{p_i} 1.5w(i \times dgx + j \times dgy) + \sum_{p_i} wG_t(plevel \times dgx + plevel \times dgy) \right)$$

for $i = 1$ to $(2 \times plevel + W_{patch})$, $j = 1$ to $plevel + 1$ $$\begin{cases} d = |N_{can}(p_i) - N_{cur}(p_i)| \\ dgx = |\nabla_x \cdot (\Delta_x N_{can}(p_i)) - \nabla_x \cdot (\Delta_x N_{cur}(p_i))| \quad \text{where} \\ dgy = |\nabla_y \cdot (\Delta_y N_{can}(p_i)) - \nabla_y \cdot (\Delta_y N_{cur}(p_i))| \end{cases}$$

$$w = \begin{cases} 0, \text{ if } p_i \in \text{lacuna region} \\ 1, \text{ if } p_i \in \text{source region} \end{cases}, \quad w_{ij} = \begin{cases} 26, \text{ if } j = plevel + 1 \\ 5, \text{ if } j = plevel + 1 \\ 1, \text{ otherwise} \end{cases},$$

$$w_{mn} = \begin{cases} 2, \text{ if } j = plevel = plevel + 1 \\ 1, \text{ otherwise} \end{cases}$$

$$G_t = \begin{cases} 5, \text{ if } t = 1 \\ 2.5, \text{ if } t = 2 \\ 0, \text{ otherwise} \end{cases}$$

$W_{patch}$ denotes a patch length, plevel denotes a patch level i denotes a position index in horizontal direction j denotes a position index in vertical direction, where $N_{cur}(p_i)$ represent the feature value at pixel pi in the neighborhood of current patch, $N_{can}(p_i)$ represent the feature value at pixel pi in the neighborhood of candidate path, respectively, $\nabla_x \cdot (\Delta_x N_{can})$ represents the value of the gradient of Laplacian in horizontal at pixel pi in neighborhood of candidate patch; and copying a part of the background area surrounded by the second patch and inserting the part of the background area surrounded by the second patch into the lacuna region surrounded by the first patch;

sending the second image to the output module; and the output module outputting the first image or the second image.

2. The image-capturing method of claim 1, further comprising compressing the first image or the second image by an image-compression module before the output module outputting the first image or the second image.

3. The image-capturing method of claim 1, wherein the identifying step further comprises comparing the first image with the target-image previously stored in an image database.

4. The image-capturing method of claim 1, wherein the identifying step further comprises manually identifying the unwanted object in the first image.

5. The image-capturing method of claim 1, wherein the unwanted object processing step further comprises: using an morphological dilation processing to dilate the boundary of the lacuna region before the color distribution analysis step.

6. An image-capturing method, suitable in an image-capturing device for removing an unwanted object from an image, the image-capturing method comprising:

inputting a first image;

determining if an unwanted object processing step should be performed on the first image, and obtaining a result;

if the result is no, directly sending the first image to an output module;

if the result is yes, starting an identifying step to identify at least a target-image and at least an unwanted object in the first image, and performing an unwanted object processing step to generate a second image, wherein the unwanted object processing step comprises:

removing the unwanted object and leaving at least a lacuna region in the first image, wherein another part of the first image other than the lacuna region is a background area, and the background area has a plurality of first pixels around a boundary of the lacuna region;

performing a color distribution analysis step on first pixel to adjust the texture characteristics around the lacuna region; and performing a copy step to copy part of the first pixels and insert copied first pixels into the lacuna region to form to form a filled-in area, wherein the step of copying part of the first pixels and inserting th copied first pixels into the lacuna region is in accordance with an algorithm, and the algorithm comprises:

performing a copy step to copy part of the first pixels and insert copied first pixels into the lacuna region to form a filled-in area, wherein the step of copying part of the first pixels and inserting the copied first pixels into the lacuna region is in accordance with an algorithm, and the algorithm comprises;

dividing the lacuna region into a plurality of sub-areas, wherein the sub-areas are bar-shaped and each of the sub-areas has a plurality of second pixels;

according to the sub-areas, dividing the background area into a plurality of image source areas, wherein each sub-area and each corresponding image source area are in the same row or the same column, and each image source area has a plurality of third pixels;

wherein and computing the values of the third pixels and inserting a result into the second pixels, wherein the step of weighting and computing the values of the third pixels and inserting the result into the second pixels is in accordance with an equation:

$$P_{Mi''} = \left( \sum_{n=i''-2}^{i''+2} W_n P_{Ln} + \sum_{n=i''-2}^{i''+2} W_n P_{Rn} \right) / 2,$$

where i' denotes the column or the row in the image, W is a weighted value, Wi'+2 and Wi'+2=0.05, and Wi'=0.4 if PLn and PRn are in the background area and PMi' is a pixel value in the lacuna region, and if PLn or PRn are in the lacuna region, Pi'+1=2Pi'−1, Pi'+2=2, Pi'−Pi'−2, Pi'−1=2Pi'−Pi'+1, and Pi'−2=2Pi'−Pi'+2 are further included;

sending the second image to the output module; and the output module outputting the first image or the second image.

7. The image-capturing method of claim 6, wherein the weighted value is a Gaussian kernel.

8. The image-capturing method of claim 6, further comprising compressing the first image or the second image by an image-compression module before the output module output the first image or the second image.

9. The image-capturing method of claim 6, wherein the identifying step further comprises comparing the first image with the target-image previously stored in an image database.

10. The image-capturing method of claim 6, wherein the identifying step further comprises manually identifying the unwanted object in the first image.

11. The image-capturing method of claim 6, wherein the unwanted object processing step further comprises: using an morphological dilation processing to dilate the boundary of the lacuna region before the color distribution analysis step.

* * * * *